United States Patent
Maruta

(10) Patent No.: US 9,177,545 B2
(45) Date of Patent: Nov. 3, 2015

(54) RECOGNITION DICTIONARY CREATING DEVICE, VOICE RECOGNITION DEVICE, AND VOICE SYNTHESIZER

(75) Inventor: Yuzo Maruta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 860 days.

(21) Appl. No.: 13/500,855

(22) PCT Filed: Jan. 22, 2010

(86) PCT No.: PCT/JP2010/000369
§ 371 (c)(1),
(2), (4) Date: Apr. 6, 2012

(87) PCT Pub. No.: WO2011/089651
PCT Pub. Date: Jul. 28, 2011

(65) Prior Publication Data
US 2012/0203553 A1    Aug. 9, 2012

(51) Int. Cl.
*G10L 15/06* (2013.01)
*G10L 13/08* (2013.01)
*C01G 41/00* (2006.01)
*G10L 15/187* (2013.01)

(52) U.S. Cl.
CPC .............. *G10L 15/06* (2013.01); *C01G 41/00* (2013.01); *G10L 13/08* (2013.01); *C01P 2006/80* (2013.01); *G10L 15/187* (2013.01)

(58) Field of Classification Search
CPC .............................. G10L 15/06; G10L 15/187
USPC .................................. 704/257, 258, 260, 270
See application file for complete search history.

(56) References Cited

U.S. PATENT DOCUMENTS

| | | | |
|---|---|---|---|
| 6,233,553 B1 * | 5/2001 | Contolini et al. | 704/220 |
| 6,236,965 B1 * | 5/2001 | Kim et al. | 704/254 |
| 6,249,763 B1 | 6/2001 | Minematsu | |
| 6,272,464 B1 | 8/2001 | Kiraz et al. | |
| 6,389,394 B1 * | 5/2002 | Fanty | 704/249 |
| 6,434,521 B1 * | 8/2002 | Barnard | 704/244 |
| 7,113,908 B2 * | 9/2006 | Goronzy et al. | 704/244 |

(Continued)

FOREIGN PATENT DOCUMENTS

| | | |
|---|---|---|
| JP | 11-202889 A | 7/1999 |
| JP | 2000-352989 A | 12/2000 |

(Continued)

OTHER PUBLICATIONS

Goronzy et al. "Automatic Pronunciation Modelling for Multiple Non-Native Accents", IEEE Workshop on Automatic Speech Recognition and Understanding, 2003. ASRU '03. 2003.*

*Primary Examiner* — Jialong He
(74) *Attorney, Agent, or Firm* — Birch, Stewart, Kolasch & Birch, LLP

(57) ABSTRACT

A recognition dictionary creating device includes a user dictionary in which a phoneme label string of an inputted voice is registered and an interlanguage acoustic data mapping table in which a correspondence between phoneme labels in different languages is defined, and refers to the interlanguage acoustic data mapping table to convert the phoneme label string registered in the user dictionary and expressed in a language set at the time of creating the user dictionary into a phoneme label string expressed in another language which the recognition dictionary creating device has switched.

6 Claims, 10 Drawing Sheets

(56) References Cited

U.S. PATENT DOCUMENTS

| | | | |
|---|---|---|---|
| 7,149,688 B2 * | 12/2006 | Schalkwyk | 704/255 |
| 7,181,395 B1 * | 2/2007 | Deligne et al. | 704/249 |
| 7,266,495 B1 * | 9/2007 | Beaufays et al. | 704/236 |
| 7,292,980 B1 | 11/2007 | August et al. | |
| 7,630,898 B1 * | 12/2009 | Davis et al. | 704/266 |
| 8,290,775 B2 * | 10/2012 | Etezadi et al. | 704/260 |
| 2002/0013707 A1 * | 1/2002 | Shaw et al. | 704/257 |
| 2002/0087317 A1 * | 7/2002 | Lee et al. | 704/257 |
| 2002/0111805 A1 * | 8/2002 | Goronzy et al. | 704/250 |
| 2002/0173966 A1 * | 11/2002 | Henton | 704/277 |
| 2003/0050779 A1 * | 3/2003 | Riis et al. | 704/236 |
| 2004/0148161 A1 * | 7/2004 | Das et al. | 704/224 |
| 2004/0210438 A1 * | 10/2004 | Gillick et al. | 704/254 |
| 2005/0182629 A1 * | 8/2005 | Coorman et al. | 704/266 |
| 2005/0197835 A1 * | 9/2005 | Reinhard et al. | 704/249 |
| 2005/0203738 A1 * | 9/2005 | Hwang | 704/243 |
| 2006/0143008 A1 * | 6/2006 | Schneider et al. | 704/251 |
| 2006/0224384 A1 * | 10/2006 | Dow et al. | 704/257 |
| 2007/0255567 A1 * | 11/2007 | Bangalore et al. | 704/260 |
| 2007/0294082 A1 * | 12/2007 | Jouvet et al. | 704/231 |
| 2009/0157402 A1 * | 6/2009 | Lin et al. | 704/254 |
| 2009/0248395 A1 * | 10/2009 | Alewine et al. | 704/7 |
| 2010/0145707 A1 * | 6/2010 | Ljolje et al. | 704/267 |
| 2010/0211376 A1 * | 8/2010 | Chen et al. | 704/2 |

FOREIGN PATENT DOCUMENTS

| | | |
|---|---|---|
| JP | 2001-188556 A | 7/2001 |
| JP | 2001-282788 A | 10/2001 |
| JP | 2001-296880 A | 10/2001 |
| JP | 2002-247646 A | 8/2002 |
| JP | 2007-155833 A | 6/2007 |

* cited by examiner

RECOGNITION DICTIONARY CREATING DEVICE, VOICE RECOGNITION DEVICE, AND VOICE SYNTHESIZER

FIELD OF THE INVENTION

The present invention relates to a recognition dictionary creating device that registers a word in a dictionary for voice recognition through a user's uttered voice, a voice recognition device using this recognition dictionary creating device, and a voice synthesizer using the recognition dictionary creating device.

BACKGROUND OF THE INVENTION

An application which employs voice recognition registers a user's uttered voice and uses this voice as a word to be recognized in some cases. Hereinafter, this operation will be referred to as creation of a user dictionary. As examples of creation of a user dictionary from a voice, there are a case in which a radio station name corresponding to a frequency of a radio is registered by voice, and a case in which the name of a person or a place name corresponding to a telephone number is registered by voice.

Further, a language switching function is required of voice recognition mounted in equipment which can be used over a plurality of countries, such as a car navigation system and a mobile terminal.

As a related conventional technology, for example, patent reference 1 discloses a using language switching method of determining a language which a user desires to use when switching between using languages for an electronic dictionary by comparing character data which is acquired by performing voice recognition on the user's uttered voice with words stored therein.

Typically, voice data are collected for each language, and the user's uttered voice is recognized by using a voice-recognition algorithm and a voice standard model which are configured by using the collected voice data. Therefore, when switching between languages is performed, it is necessary to change the voice recognition unit itself and the sound standard model.

Conventionally, a voice recognition device which creates phoneme label strings each of which expresses a user's uttered voice best for each language by using a typically-known voice recognition technique, and then storing the phoneme label string as a user dictionary, thereby making it possible to perform voice recognition on the user's uttered voice even if switching between languages used for voice recognition is also proposed.

A problem is, however, that because voice utterances are stored in a memory and are processed when creating phoneme label strings every time when the language is changed, a large-volume memory which can allocate a storage area to the voice utterances is needed.

Further, in a case in which voice utterances cannot be stored in a memory, phoneme label strings must be created for each of all the languages which are assumed to be used. However, because it takes much time to create phoneme label strings even for a single language, the processing time required to create phoneme label strings for each of all the languages which are assumed to be used becomes huge. In addition, a large-volume memory which can store phoneme label strings for all the languages is also needed.

The present invention is made in order to solve the above-mentioned problems, and it is therefore an object of the present invention to provide a recognition dictionary creating device which does not have to have a large-volume memory for storing voice utterances or create phoneme label strings for all languages in advance, and which can shorten the time required to create phoneme label strings for each language, a voice recognition device using this recognition dictionary creating device, and a voice synthesizer using the recognition dictionary creating device.

RELATED ART DOCUMENT

Patent Reference

Patent reference 1: Japanese Unexamined Patent Application Publication No. 2001-282788

SUMMARY OF THE INVENTION

In accordance with the present invention, there is provided a recognition dictionary creating device including: an acoustic analysis unit for performing an acoustic analysis on a voice signal of an inputted voice to output a time series of acoustic features; an acoustic standard pattern storage unit for storing acoustic standard patterns showing standard acoustic features for each language; an acoustic data matching unit for comparing the time series of acoustic features of the inputted voice which are inputted thereto from the acoustic analysis unit with the acoustic standard patterns stored in the acoustic standard pattern storage unit to create a phoneme label string of the inputted voice; a user dictionary storage unit for storing a user dictionary in which the phoneme label string of the inputted voice created by the acoustic data matching unit is registered; a language storage unit for storing information showing a language of the phoneme label string which is registered in the user dictionary; a language switching unit for switching from a language to another language; a mapping table storage unit for storing a mapping table in which a correspondence between phoneme labels in different languages is defined; and a phoneme label string converting unit for referring to the mapping table stored in the mapping table storage unit to convert the phoneme label string registered in the user dictionary and expressed in the language shown by the information stored in the language storage unit into a phoneme label string expressed in the other language which the language switching unit has switched.

The recognition dictionary creating device in accordance with the present invention includes the user dictionary in which a phoneme label string of an inputted voice is registered, and the mapping table in which a correspondence between phoneme labels in different languages is defined, and refers to the mapping table to convert the phoneme label string registered in the user dictionary and expressed in a language set at the time of creating the user dictionary into a phoneme label string expressed in another language which the language switching unit has switched.

Because even after switching to another language, the recognition dictionary creating device can convert the registered word into a word expressed in the other language which the language switching unit has switched at a high speed by referring to the mapping table in the above-mentioned way, there is provided an advantage of eliminating the necessity to provide a large-volume memory for storing voice utterances and create phoneme label strings for all languages in advance, and being able to shorten the time required to create phoneme label strings for each language.

EMBODIMENTS OF THE INVENTION

Hereafter, in order to explain this invention in greater detail, the preferred embodiments of the present invention will be described with reference to the accompanying drawings.

Embodiment 1

Figure 1:
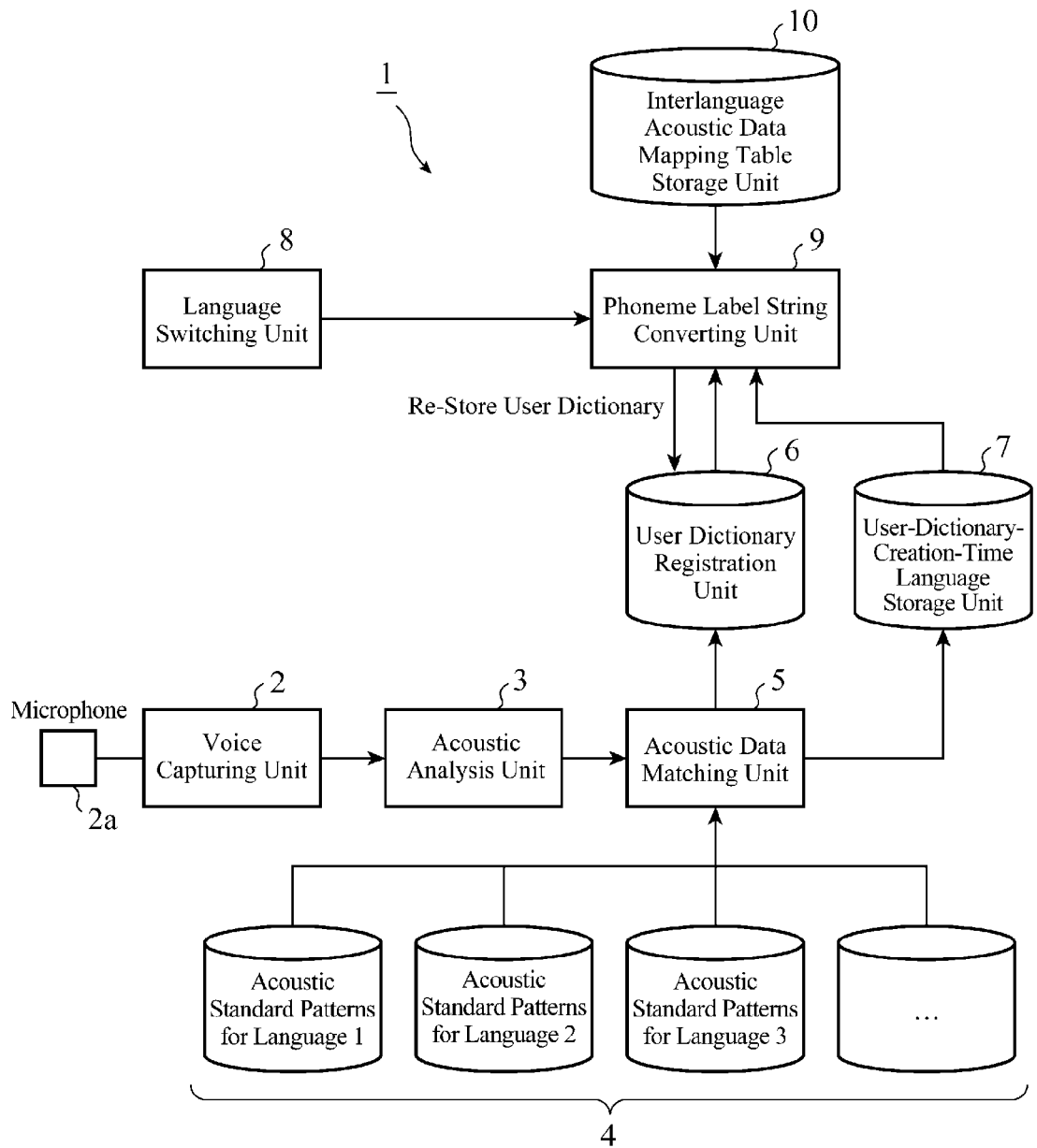
FIG. 1 is a block diagram showing the structure of a recognition dictionary creating device in accordance with Embodiment 1 of the present invention.

FIG. 1 is a block diagram showing the structure of a recognition dictionary creating device in accordance with Embodiment 1 of the present invention. Referring to FIG. 1, the recognition dictionary creating device 1 in accordance with Embodiment 1 is provided with a microphone 2a, a voice capturing unit 2, an acoustic analysis unit 3, acoustic standard patterns 4 provided for each language, an acoustic data matching unit 5, a user dictionary registration unit (user dictionary storage unit) 6, a user-dictionary-creation-time language storage unit (language storage unit) 7, a language switching unit 8, and a phoneme label string converting unit 9, and an interlanguage acoustic data mapping table storage unit 10 (mapping table storage unit).

The voice capturing unit 2 is a component for converting a voice captured by the microphone 2a into a digital signal. The acoustic analysis unit 3 is a component for analyzing the voice signal digitized by the voice capturing unit 2 to convert the voice signal into a time series of acoustic features. For example, the acoustic analysis unit analyzes the voice signal at fixed time intervals to calculate an acoustic feature quantity (acoustic feature quantity vector) showing acoustic features.

The acoustic standard patterns 4 are standard acoustic features respectively corresponding to phoneme label strings expressed in a language X (X=1, 2, 3, . . . )(a standard model showing the properties of acoustic feature quantities about voice fragments). For example, the acoustic standard patterns are created through modeling in units of a phoneme by using HMM (Hidden Markov Model) or the like. The acoustic data matching unit 5 is a component for comparing the time series of acoustic features of the inputted voice, which are acquired by the acoustic analysis unit 3, with the acoustic standard patterns 4 corresponding to the language X to create a phoneme label string which is the most similar to the inputted voice from the phoneme label strings corresponding to the standard acoustic features which construct the acoustic standard patterns 4.

The user dictionary registration unit 6 is a component having a user dictionary, and stores the phoneme label string of the inputted voice created by the acoustic data matching unit 5 in the user dictionary. The user-dictionary-creation-time language storage unit 7 is a storage unit for storing information showing a setting language which the recognition dictionary creating device sets as a language for voice recognition when creating the user dictionary. The language switching unit 8 is a component for switching between setting languages each of which is used as a language for voice recognition.

The phoneme label string converting unit 9 is a component for converting a phoneme label string which is expressed in the language set at the time of registering the phoneme label string in the user dictionary into a phoneme label string expressed in a language to which the language switching unit 8 has switched by using an interlanguage acoustic data mapping table. The interlanguage acoustic data mapping table storage unit 10 is a storage unit for storing interlanguage sound data mapping tables each showing a correspondence between phoneme labels expressed in one of a pair of different languages and phoneme labels expressed in the other language of the pair.

In a case in which a language of a pair cannot express a phoneme label in another language of the pair, a phoneme label, among phoneme labels which can be expressed in the language, which is the most similar to the phoneme label in the other language is brought into correspondence with this phoneme label. For example, the English phoneme label /l/ cannot be expressed in Japanese. Therefore, in the interlanguage sound data mapping table between Japanese and English, the Japanese phoneme label /r/ which is the most similar to the English phoneme label /l/ in pronunciation is brought into correspondence with the English phoneme label /l/.

Further, by storing a recognition dictionary creating program according to the scope of the present invention in a computer, and then causing a CPU to execute this recognition dictionary creating program, the voice capturing unit 2, the acoustic analysis unit 3, the acoustic standard patterns 4, the acoustic data matching unit 5, the user dictionary registration unit 6, the user-dictionary-creation-time language storage unit 7, the language switching unit 8, the phoneme label string converting unit 9, and the interlanguage acoustic data mapping table storage unit 10 can be implemented on the computer as a concrete means in which hardware and software work in cooperation with each other. In addition, a storage area which is used by the acoustic standard patterns 4, the user dictionary registration unit 6, the user-dictionary-creation-time language storage unit 7, and the interlanguage acoustic data mapping table storage unit 10 is configured in a storage unit mounted in the above-mentioned computer, e.g. a hard disk drive unit or an external storage medium.

Next, operations of the recognition dictionary creating device will be explained.

Figure 2:
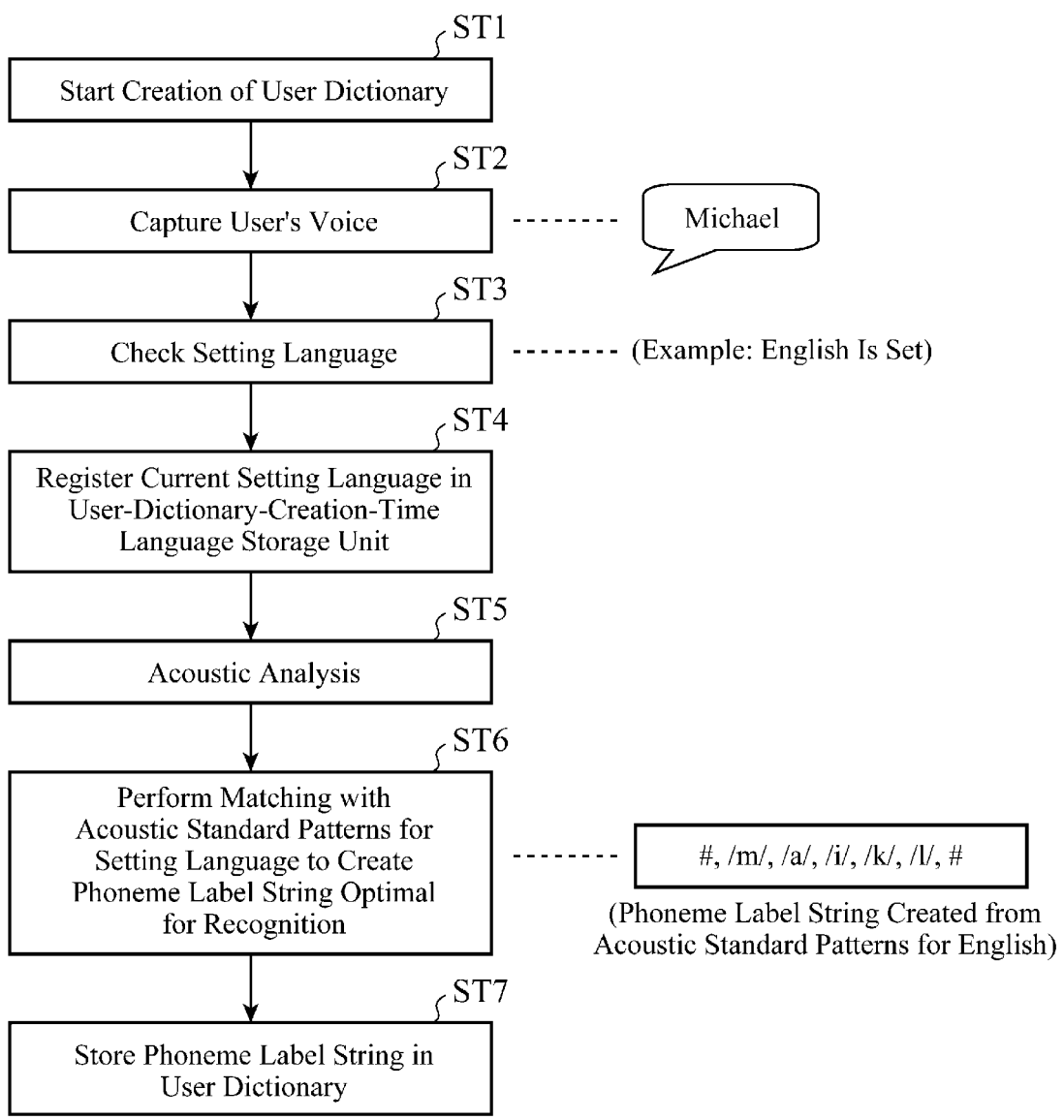
FIG. 2 is a flow chart showing a flow of a user dictionary registering operation performed by the recognition dictionary creating device in accordance with Embodiment 1.

FIG. 2 is a flowchart showing a flow of a user dictionary registering operation performed by the recognition dictionary creating device in accordance with Embodiment 1.

After commanding the recognition dictionary creating device to start creation of a user dictionary by using an input unit (step ST1), a user utters a word which he or she is going to register in the recognition dictionary creating device. For example, it is assumed that the user utters "Michael" which is a personal name. The voice capturing unit 2 captures the voice uttered by the user via the microphone 2a, and then converts this inputted voice into a digital signal and outputs this digital signal to the acoustic analysis unit 3 (step ST2).

Next, the user-dictionary-creation-time language storage unit 7 checks the setting language at the time of registration in the user dictionary, the setting language being currently set to the acoustic data matching unit 5 (step ST3), and registers information showing the setting language therein (step ST4). The setting language is set in advance as the language which is the target for voice recognition and voice synthesis in both a voice recognition device using the recognition dictionary creating device 1 and a voice synthesizer using the recognition dictionary creating device 1. In the example of FIG. 2, English is currently set as the setting language. The acoustic analysis unit 3 performs an acoustic analysis on the voice signal inputted from the voice capturing unit 2 in step ST2, and then converts this voice signal into a time series of acoustic features (step ST5).

The acoustic data matching unit 5 reads the acoustic standard patterns 4 corresponding to the language (setting language) set thereto, and compares the acoustic standard patterns 4 corresponding to this setting language with the time series of acoustic features of the inputted voice which are acquired by the acoustic analysis unit 3 to create an optimal phoneme label string which shows the inputted voice and which is the most similar to the time series of acoustic features of the inputted voice from the phoneme label strings corresponding to the standard acoustic features which construct the acoustic standard patterns 4 (step ST6). For example, in a case in which the inputted voice is "Michael" and the setting language is English, the acoustic data matching unit acquires a phoneme label string of "#, /m/, /a/, /i/, /k/, /l/, #", as shown in FIG. 2.

The user dictionary registration unit 6 registers the phoneme label string of the inputted voice which is created by the acoustic data matching unit 5 in the user dictionary (step ST7). As a result, the user dictionary in which a phoneme label string corresponding to the text expressed in the setting language of a word to be registered is registered is created.

Next, an operation at the time of switching between setting languages is explained below.

Figure 3:
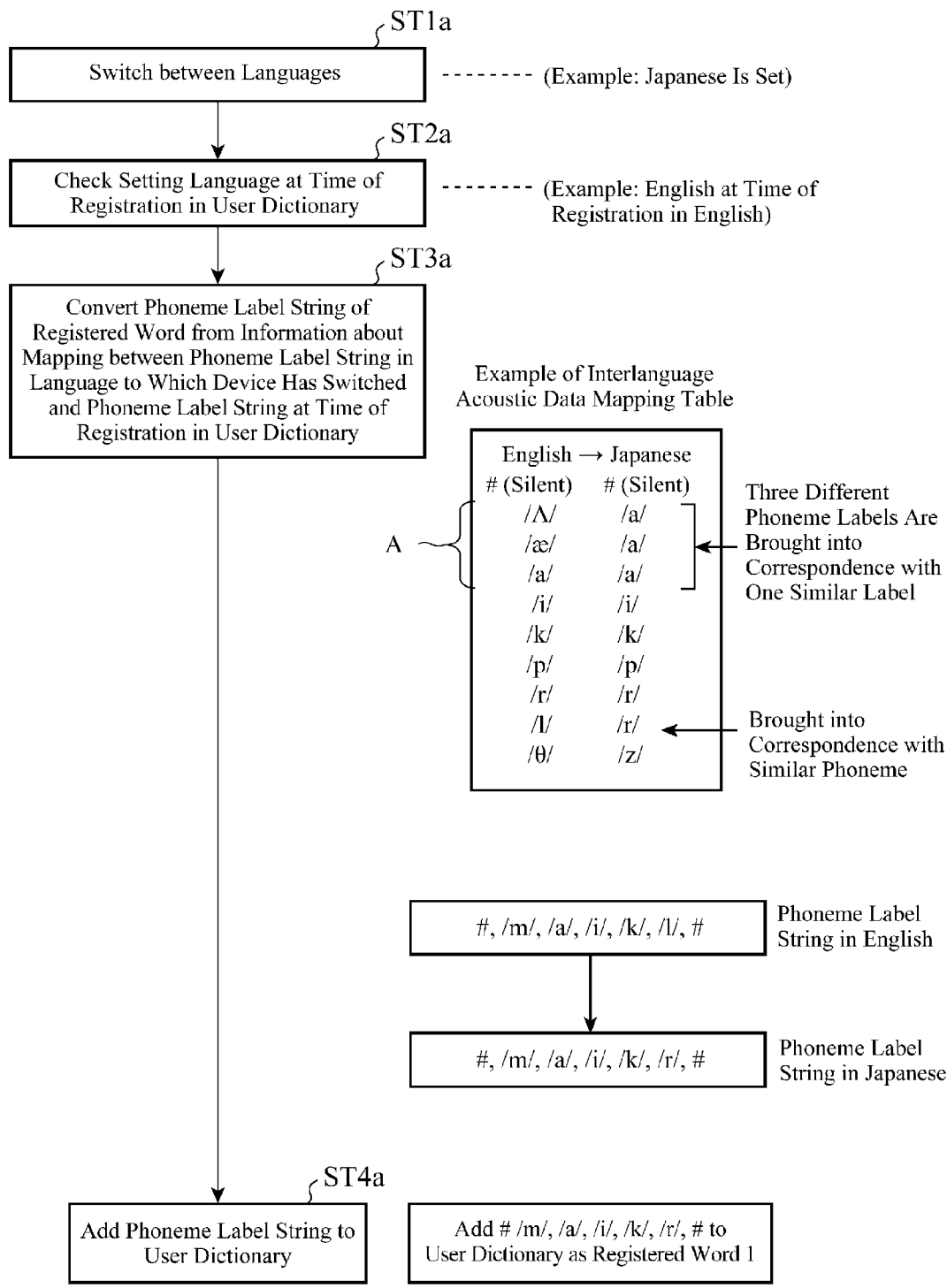
FIG. 3 is a flow chart showing a flow of the user dictionary registering operation which the recognition dictionary creating device in accordance with Embodiment 1 performs after switching between languages.

FIG. 3 is a flow chart showing a flow of the user dictionary registration operation which the recognition dictionary creating device in accordance with Embodiment 1 performs after switching between setting languages. A case in which after the user dictionary registration operation shown in FIG. 2 is performed, switching between setting languages is performed is shown.

For example, in response to a language which the user newly sets to the language switching unit 8 by using the input unit, the language switching unit 8 switches to the language and sets the language to which the language switching unit has switched to the phoneme label string converting unit 9 (step ST1a). Hereafter, it is assumed that the language switching unit has switched to Japanese.

The phoneme label string converting unit 9 reads the information showing the language stored in the user-dictionary-creation-time language storage unit 7 to check the setting language at the time of registration in the user dictionary (step ST2a). As mentioned above, the setting language at the time of registration in the user dictionary is English in the example of FIG. 2.

Next, the phoneme label string converting unit 9 uses both the setting language at the time of registration in the user dictionary which the phoneme label string converting unit has checked in step ST2a, and the language which is specified by the language switching unit 8 and to which the language switching unit has switched to search through the interlanguage acoustic data mapping table storage unit 10 to read the interlanguage sound data mapping table corresponding to the setting language at the time of registration in the user dictionary and the language to which the language switching unit has switched.

The interlanguage sound data mapping table shows a correspondence between English phoneme labels and Japanese phoneme labels, as shown in FIG. 3. Referring to FIG. 3, three different English phoneme labels shown by a reference character A which are similar in pronunciation to one another include what cannot be expressed in Japanese, for example. In this case, the Japanese phoneme label (/a/) which is similar in pronunciation to the English phoneme labels shown by the reference character A is brought into correspondence with the English phoneme labels. Further, because the English phoneme label /l/ cannot be expressed by any Japanese phoneme label, the Japanese phoneme label /r/ which is similar in pronunciation to the English phoneme label /l/ is brought into correspondence with the English phoneme label /l/.

The phoneme label string converting unit 9 converts the phoneme label string registered in the user dictionary into a phoneme label string expressed in the language to which the language switching unit has switched according to the interlanguage acoustic data mapping table read from the interlanguage acoustic data mapping table storage unit 10 (step ST3a).

For example, as shown in FIG. 3, the phoneme label string converting unit converts "#, /m/, /a/, /i/, /k/, /l/, #" which is the English phoneme label string of "Michael" into "#, /m/, /a/, /i/, /k/, /r/, #" which is a Japanese phoneme label string according to the correspondence in the interlanguage sound data mapping table between English and Japanese.

A method of creating an interlanguage acoustic data mapping table is disclosed by the following reference 1.

(Reference 1); Japanese Unexamined Patent Application Publication No. 2007-155833

The user dictionary registration unit 6 re-stores the phoneme label string to which the original phoneme label string is converted by the phoneme label string converting unit 9 in step ST3a in the user dictionary (step ST4a). Referring to FIG. 3, because the registered word is "Michael" and the language to which the language switching unit has switched is Japanese, "#, /m/, /a/, /l/, /k/, /r/, #" which is a Japanese phoneme label string is stored as one registered word.

As mentioned above, the recognition dictionary creating device in accordance with this Embodiment 1 is provided with the user dictionary in which a phoneme label string of an inputted voice is registered, and an interlanguage acoustic data mapping table in which a correspondence between phoneme labels in different languages is defined, and converts the phoneme label string expressed in a language which was set at the time of creating the user dictionary into a phoneme label string expressed in another language to which the recognition dictionary creating device has switched by referring to the interlanguage acoustic data mapping table.

Because the recognition dictionary creating device is configured in this way, even when the setting language is switched from the one at the time of registration in the user dictionary to another language, the recognition dictionary creating device can create a user dictionary written in the other language to which the recognition dictionary creating device has switched only by converting the phoneme label string into a phoneme label string expressed in the other language according to the interlanguage acoustic data mapping table, and can remarkably reduce the processing time required to create a phoneme label string corresponding to the other language.

Further, even when creating a phoneme label string every time when the recognition dictionary creating device changes the setting language, the recognition dictionary creating device does not have to store a voice utterance. In addition, the recognition dictionary creating device has only to store only a phoneme label string at the time of registration in the user dictionary and does not have to create phoneme labels for all languages which are assumed to be used in advance. As a result, there is no necessity to provide a large-volume memory.

Embodiment 2

Figure 4:
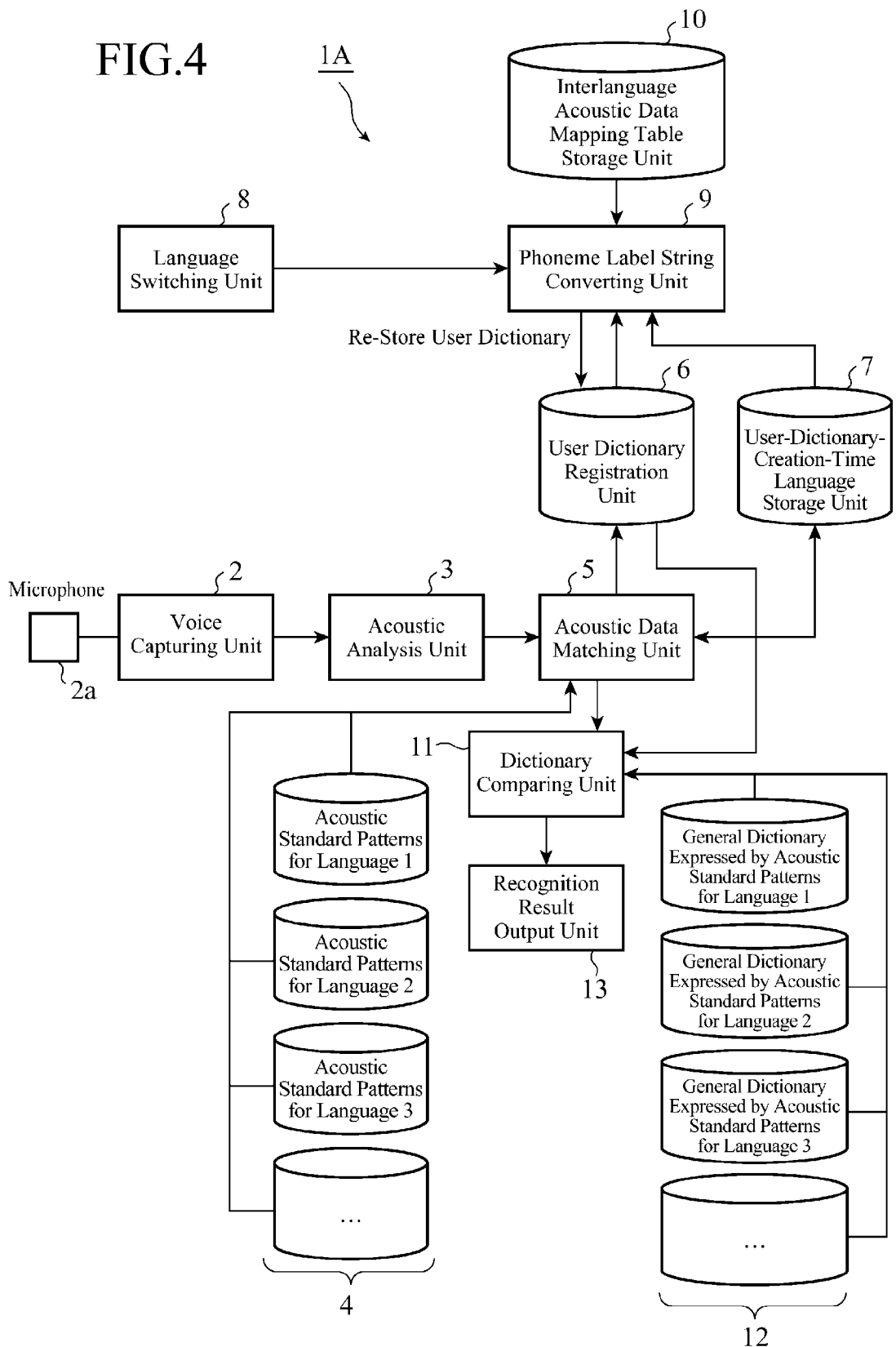
FIG. 4 is a block diagram showing the structure of a voice recognition device in accordance with Embodiment 2 of the present invention.

FIG. 4 is a block diagram showing the structure of a voice recognition device in accordance with Embodiment 2 of the present invention, and shows the voice recognition device using the recognition dictionary creating device in accordance with above-mentioned Embodiment 1. Referring to FIG. 4, the voice recognition device 1A in accordance with Embodiment 2 is provided with a dictionary comparing unit 11, a general dictionary 12 expressed by acoustic standard patterns for each language, and a recognition result output unit 13, in addition to the structural components of the recognition dictionary creating device 1 shown in above-mentioned Embodiment 1. In FIG. 4, the same components as those shown in FIG. 1 and components which operate in the same way that those shown in FIG. 1 operate are designated by the same reference numerals, and the explanation of the components will be omitted hereafter.

The dictionary comparing unit 11 is a component for comparing a phoneme label string of an inputted voice with both a vocabulary in the general dictionary 12 which is expressed by acoustic standard patterns corresponding to a setting language and a vocabulary registered in a user dictionary stored in a user dictionary registration unit 6 to specify a word which is the most similar to the phoneme label string of the inputted voice from the vocabulary in the general dictionary 12 and the vocabulary in the user dictionary. The general dictionary 12 is expressed by the acoustic standard patterns corresponding to each language X (X=1, 2, 3, . . . ) and a large-size vocabulary (phoneme label strings) including the names of places written in each language is registered in the general dictionary. The recognition result output unit 13 is a component for outputting a voice recognition result, and outputs the word which is the most similar to the phoneme label string of the inputted voice which the dictionary comparing unit 11 has acquired as the result of the comparison.

Further, by storing a voice recognition program according to the scope of the present invention in a computer, and then causing a CPU to execute this voice recognition program, the dictionary comparing unit 11, the general dictionary 12 expressed by the acoustic standard patterns for each language, and the recognition result output unit 13 can be implemented on the computer as a concrete means in which hardware and software work in cooperation with each other. In addition, a storage area which is used for the acoustic standard patterns 4 and the general dictionary 12 is configured in a storage unit mounted in the above-mentioned computer, e.g. a hard disk drive unit or an external storage medium.

Next, an operation of the voice recognition device will be explained.

Figure 5:
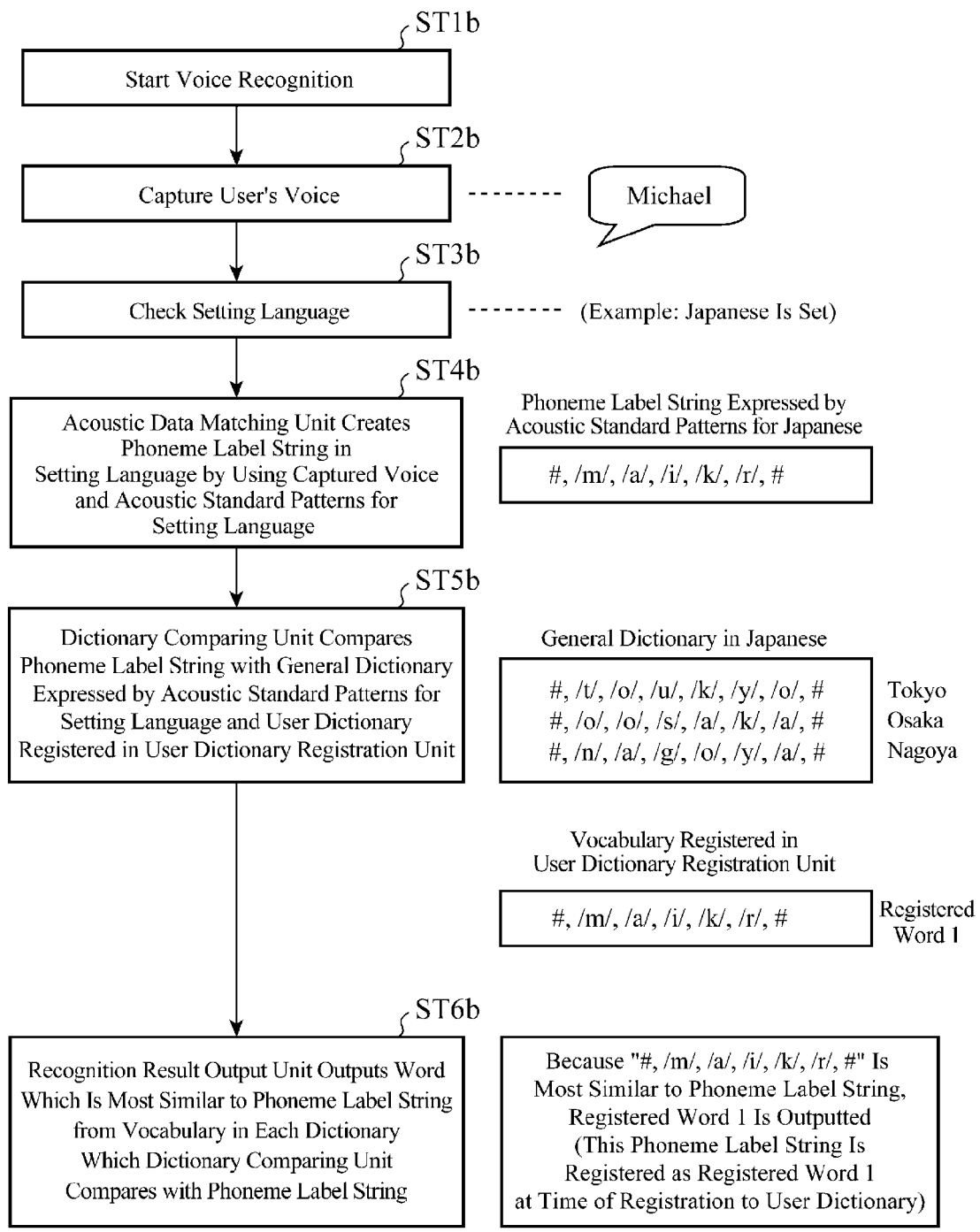
FIG. 5 is a flow chart showing a flow of an operation performed by the voice recognition device in accordance with Embodiment 2.

FIG. 5 is a flow chart showing a flow of the operation of the voice recognition device in accordance with Embodiment 2.

After commanding the voice recognition device to start voice recognition by using an input unit (step ST1b), a user utters a voice which is the target for voice recognition. For example, it is assumed that the user utters "Michael" which is a personal name. A voice capturing unit 2 captures the voice uttered by the user via a microphone 2a, and then converts this inputted voice into a digital signal and outputs this digital signal to an acoustic analysis unit 3 (step ST2b). The acoustic analysis unit 3 performs an acoustic analysis on the voice signal inputted from the voice capturing unit 2 in step ST2b, and then converts this voice signal into a time series of acoustic features.

An acoustic data matching unit 5 reads information showing a language, which is stored in a user-dictionary-creation-time language storage unit 7 to check the setting language set at the time of registration in the user dictionary (step ST3b). It is assumed that the setting language set at the time of registration in the user dictionary is Japanese in the flow chart of FIG. 5.

The acoustic data matching unit 5 then creates a phoneme label string corresponding to the inputted voice and expressed in the setting language from both the time series of acoustic features of the inputted voice captured from the acoustic analysis unit 3 and the acoustic standard patterns 4 corresponding to the setting language (step ST4b). For example, in a case in which the inputted voice is "Michael" and the setting language is Japanese, "#, /m/, /a/, /i/, /k/ /r/, #" is acquired as a phoneme label string expressed by the Japanese acoustic standard patterns.

Next, the dictionary comparing unit 11 compares the phoneme label string of the inputted voice, which is created by the acoustic data matching unit 5, with both the vocabulary in the general dictionary 12 which is expressed by the acoustic standard patterns 4 corresponding to the setting language and the vocabulary registered in the user dictionary stored in the user dictionary registration unit 6 to specify a word which is the most similar to the phoneme label string of the inputted voice from the vocabulary in the general dictionary 12 and the vocabulary in the user dictionary (step ST5b). The recognition result output unit 13 outputs the word which is acquired as the result of the comparison made by the dictionary comparing unit 11 and which is the most similar to the phoneme label string of the inputted voice (step ST6b).

As shown in FIG. 5, a large-size vocabulary, such as the names of places, is registered, as phoneme label strings, in the general dictionary 12 expressed by the acoustic standard patterns corresponding to the setting language (in this example, Japanese). Further, as shown in above-mentioned Embodiment 1, arbitrary words are registered, as phoneme label strings, in the user dictionary through the user's utterances. In a case in which "#, /m/, /a/, /i/, /k/, /r/, #" is registered as a registered word 1 of the user dictionary, the dictionary comparing unit 11 specifies the registered word 1 as the word which is the most similar to the phoneme label string of the inputted voice, and the recognition result output unit 13 outputs the registered word 1 as the recognition result.

As mentioned above, because the voice recognition device 1A in accordance with this Embodiment 2 is provided with the general dictionary storage unit for storing the general dictionary 12, the dictionary comparing unit 11 for comparing a phoneme label string of an inputted voice which is created by the acoustic data matching unit 5 with both the general dictionary 12 and the user dictionary to specify a word which is the most similar to the phoneme label string of the inputted voice from the general dictionary 12 and the user dictionary, and the recognition result output unit 13 for outputting the word specified by the dictionary comparing unit 11 as the voice recognition result, in addition to the structural components of the recognition dictionary creating device in accordance with above-mentioned Embodiment 1, there can be provided an advantage of being able to provide the voice recognition device 1A which performs voice recognition by using the user dictionary, in addition to the advantage provided by above-mentioned Embodiment 1.

Embodiment 3.

Figure 6:
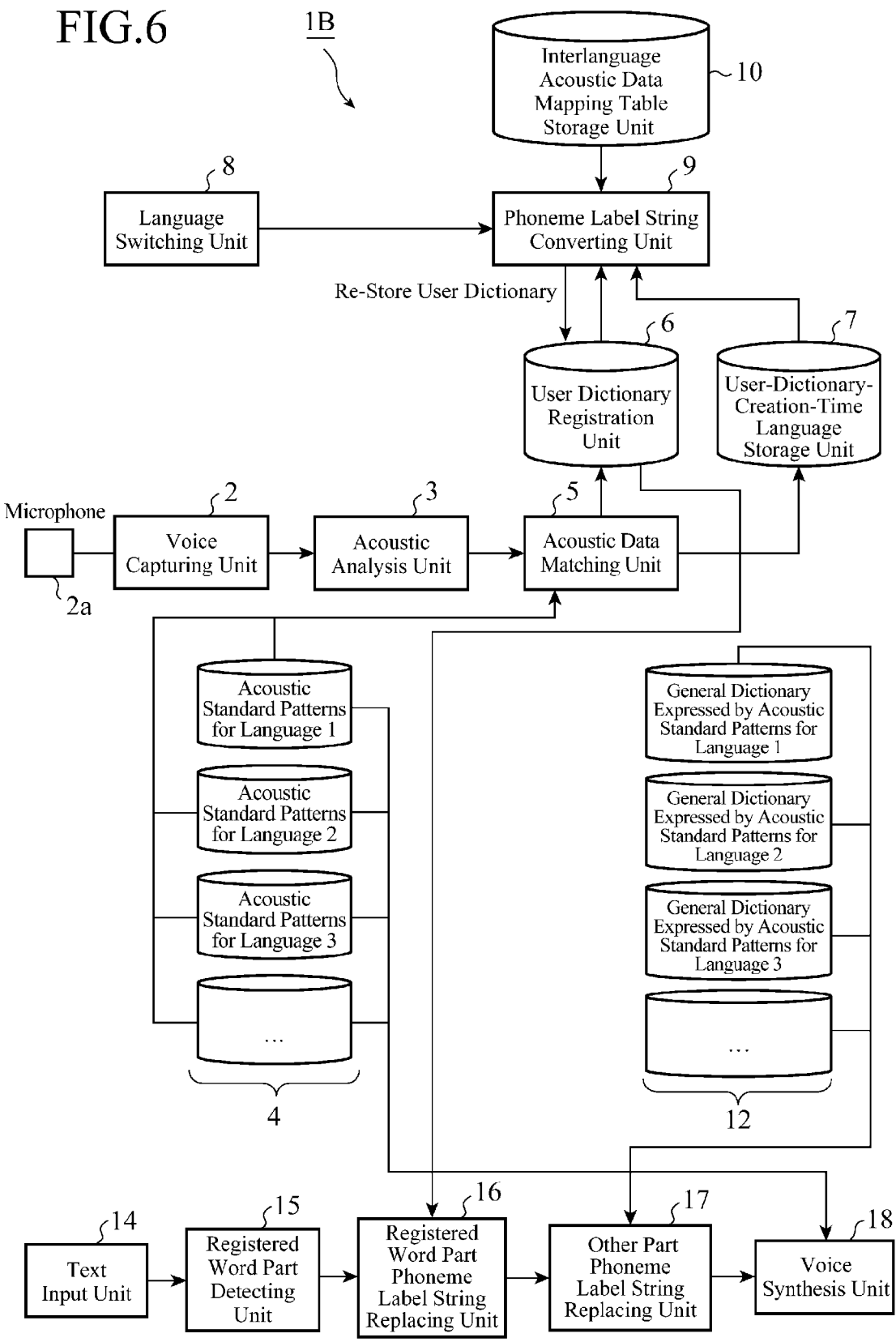
FIG. 6 is a block diagram showing the structure of a voice synthesizer in accordance with Embodiment 3 of the present invention.

FIG. 6 is a block diagram showing the structure of a voice synthesizer in accordance with Embodiment 3 of the present invention, and shows the voice synthesizer using the recognition dictionary creating device in accordance with above-mentioned Embodiment 1. Referring to FIG. 6, the voice synthesizer 1B in accordance with Embodiment 3 is provided with a text input unit 14, a registered word part detecting unit 15, a registered word part phoneme label string replacing unit (registered word replacing unit) 16, an other part phoneme label string replacing unit (general dictionary replacing unit) 17, and a voice synthesis unit 18, in addition to the structural components of the recognition dictionary creating device 1 shown in above-mentioned Embodiment 1 and the general dictionary 12 shown in above-mentioned Embodiment 2 and expressed by the acoustic standard patterns for each language. In FIG. 6, the same components as those shown in FIGS. 1 and 4 and components which operate in the same way that those shown in FIGS. 1 and 4 operate are designated by the same reference numerals, and the explanation of the components will be omitted hereafter.

The text input unit 14 is a component for inputting a text which is to be converted into a voice. The registered word part detecting unit 15 is a component for detecting a registered word which is registered in a user dictionary from the input text captured from the text input unit 14. The registered word part phoneme label string replacing unit 16 is a component for replacing the registered word detected by the registered word part detecting unit 15 with a phoneme label string captured from the user dictionary. The other part phoneme label string replacing unit 17 is a component for inputting a part of the input text other than the registered word detected by the registered word part detecting unit 15 via the registered word part phoneme label string replacing unit 16, and replaces the part of the input text other than the registered word with a phoneme label string captured from the general dictionary 12 expressed by acoustic standard patterns corresponding to a setting language. The voice synthesis unit 18 is a component for creating a synthetic voice of the input text from the phoneme label strings associated with the input text which are acquired by the phoneme label string replacing units 16 and 17.

By storing a voice synthesis program according to the scope of the present invention in a computer, and then causing a CPU to execute this voice synthesis program, the text input unit 14, the registered word part detecting unit 15, the registered word part phoneme label string replacing unit 16, the other part phoneme label string replacing unit 17, and the voice synthesis unit 18 can be implemented on the computer as a concrete means in which hardware and software work in cooperation with each other. In addition, a storage area which is used for the acoustic standard patterns 4 and the general dictionary 12 is configured in a storage unit mounted in the above-mentioned computer, e.g. a hard disk drive unit or an external storage medium.

Next, an operation of the voice synthesizer will be explained.

Figure 7:
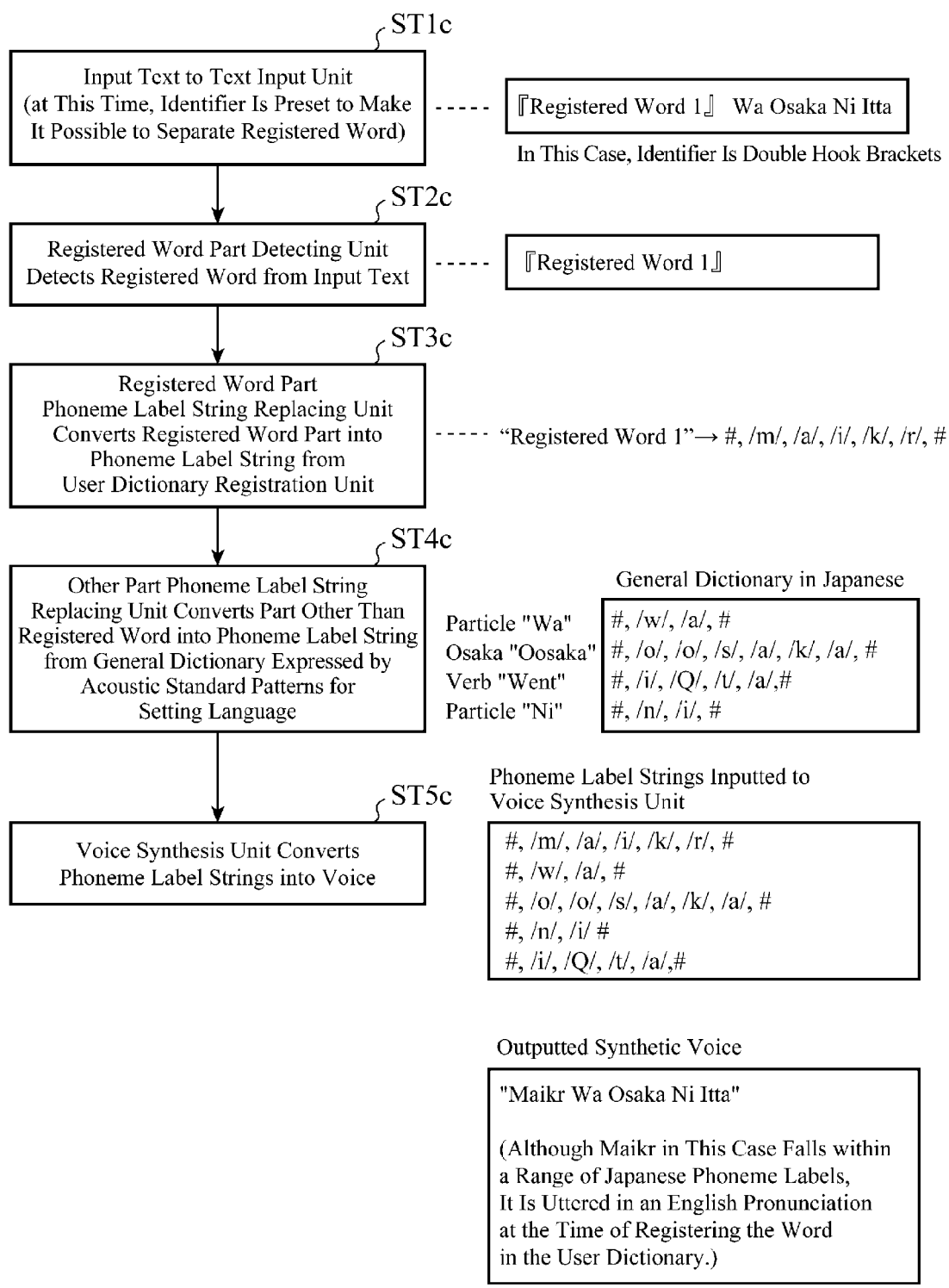
FIG. 7 is a flow chart showing a flow of an operation performed by the voice synthesizer in accordance with Embodiment 3.

FIG. 7 is a flow chart showing a flow of the operation of the voice synthesizer in accordance with Embodiment 3.

A user inputs a text to be converted into a voice to the voice synthesizer by using the text input unit 14 (step ST1c). At this time, the user sets an identifier for identifying a registered word in the user dictionary. For example, as shown in FIG. 7, when inputting a text including a registered word 1 registered in the user dictionary, the user places double hook brackets which are the identifier for identifying a registered word before and after the registered word 1.

The registered word part detecting unit 15 captures the input text from the text input unit 14, and detects the registered word by using the identifier for identifying a registered word placed in the input text (step ST2c). In the example of FIG. 7, the registered word 1 before and after which double hook brackets are placed is detected.

The registered word part phoneme label string replacing unit 16 then replaces the registered word detected by the registered word part detecting unit 15 with a phoneme label string captured from the user dictionary (step ST3c). As a result, the registered word 1 is replaced by "#, /m/, /a/, /i/, /k/, /r/, #" which is a corresponding phoneme label string.

The other part phoneme label string replacing unit 17 inputs the part in the input text other than the registered word detected by the registered word part detecting unit 15 via the registered word part phoneme label string replacing unit 16, and replaces the part in the input text other than the registered word with a phoneme label string captured from the general dictionary 12 corresponding to the setting language (step ST4c). In this case, assuming that the setting language is Japanese, the particle "wa", the noun "Osaka", the particle "ni", and the verb "itta", which are the part in the input text other than the registered word, are replaced by corresponding phoneme label strings which are registered in the Japanese general dictionary 12, respectively, as shown in FIG. 7.

The voice synthesis unit 18 creates a synthetic voice of the input text from the phoneme label strings associated with the input text which are acquired by the registered word part phoneme label string replacing unit 16 and the other part phoneme label string replacing unit 17 (step ST5c). In the example of FIG. 7, a synthetic voice of "Maikr wa Osaka ni itta" is outputted. In this case, while the part other than the registered word 1 is uttered with Japanese phoneme labels, "Maikr" which is the registered word 1 is uttered in an English pronunciation because the setting language at the time of registering the word in the user dictionary is English, as shown in above-mentioned Embodiment 1.

As mentioned above, the voice synthesizer in accordance with this Embodiment 3 includes the text input unit 14 for inputting a text, the registered word part detecting unit 15 for detecting a word part corresponding to a phoneme label string registered in the user dictionary from the character string of the input text inputted from the text input unit 14, the registered word part phoneme label string replacing unit 16 for replacing the word part detected by the registered word part detecting unit 15 with a corresponding phoneme label string acquired from the user dictionary, the other part phoneme label string replacing unit 17 for replacing a part of the input text other than the registered word part detected by the registered word part detecting unit 15 with a corresponding phoneme label string acquired from the general dictionary 12, and the voice synthesis unit 18 for creating a synthetic voice of the text from the phoneme label strings associated with the text which are acquired by the registered word part phoneme label string replacing unit 16 and the other part phoneme label string replacing unit 17, in addition to the structural components of the recognition dictionary creating device in accordance with above-mentioned Embodiment 1.

Because the voice synthesizer is configured in this way, there can be provided an advantage of providing the voice synthesizer 1B which performs a voice synthesis by using the user dictionary, in addition to the advantage provided by above-mentioned Embodiment 1.

Embodiment 4

Figure 8:
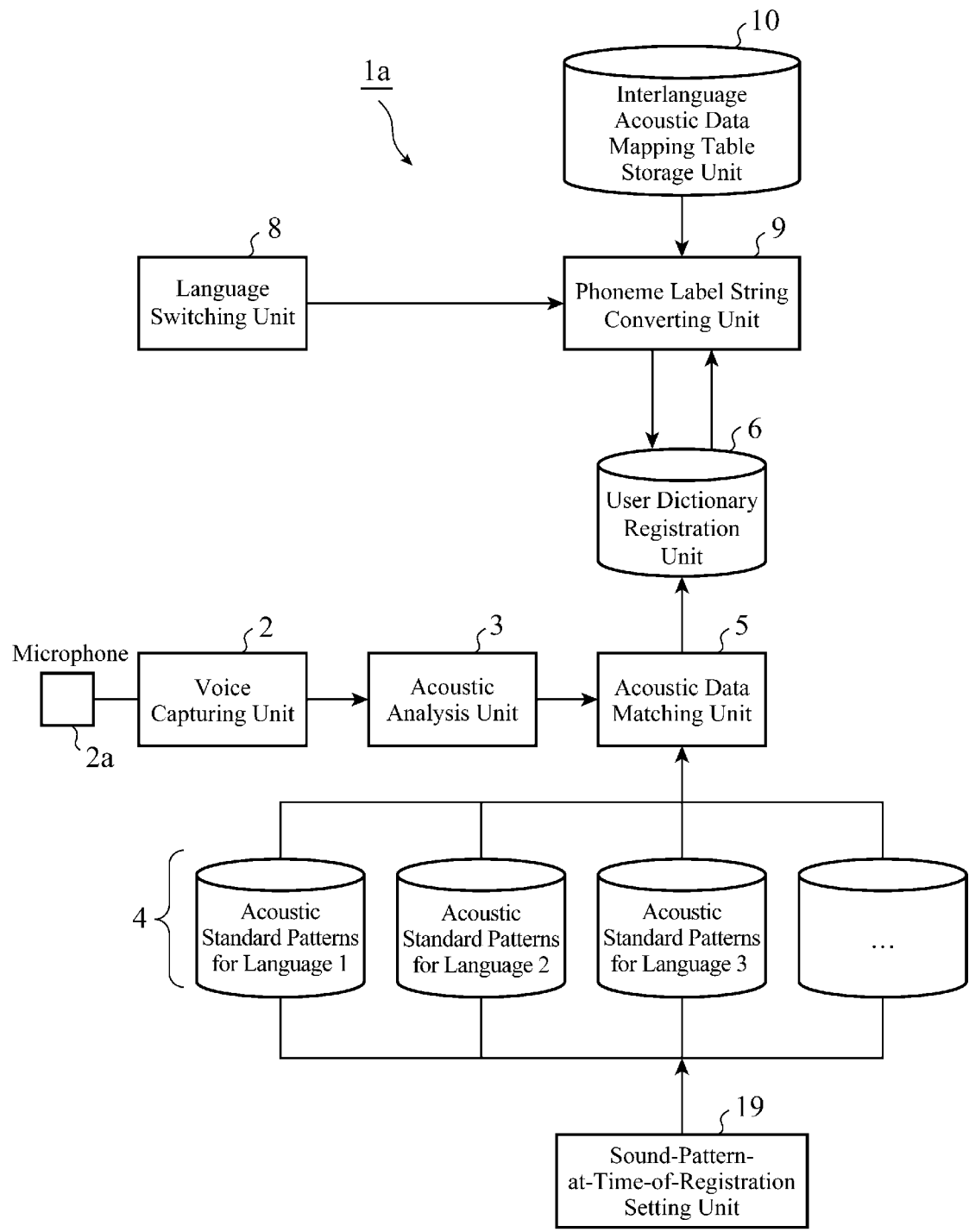
FIG. 8 is a block diagram showing the structure of a recognition dictionary creating device in accordance with Embodiment 4 of the present invention.

FIG. 8 is a block diagram showing the structure of a recognition dictionary creating device in accordance with Embodiment 4 of the present invention. Referring to FIG. 8, the recognition dictionary creating device 1a in accordance with Embodiment 4 is provided with a sound-pattern-at-time-of-registration setting unit 19 instead of the user-dictionary-creation-time language storage unit 7 in the structural components in accordance with above-mentioned Embodiment 1. The sound-pattern-at-time-of-registration setting unit 19 is a component for setting a predetermined language which is registered therein in advance as the language of acoustic standard patterns 4 used for a process performed by an acoustic data matching unit 5, regardless of a setting language which is set to either a voice recognition device which uses the recognition dictionary creating device 1a or a voice synthesizer which uses the recognition dictionary creating device 1a. This predetermined language is registered in the sound-pattern-at-time-of-registration setting unit 19 in advance independently on the setting language. In FIG. 8, the same components as those shown in FIG. 1 and components which operate in the same way that those shown in FIG. 1 operate are designated by the same reference numerals, and the explanation of the components will be omitted hereafter.

Next, an operation of the recognition dictionary creating device will be explained.

Figure 9:
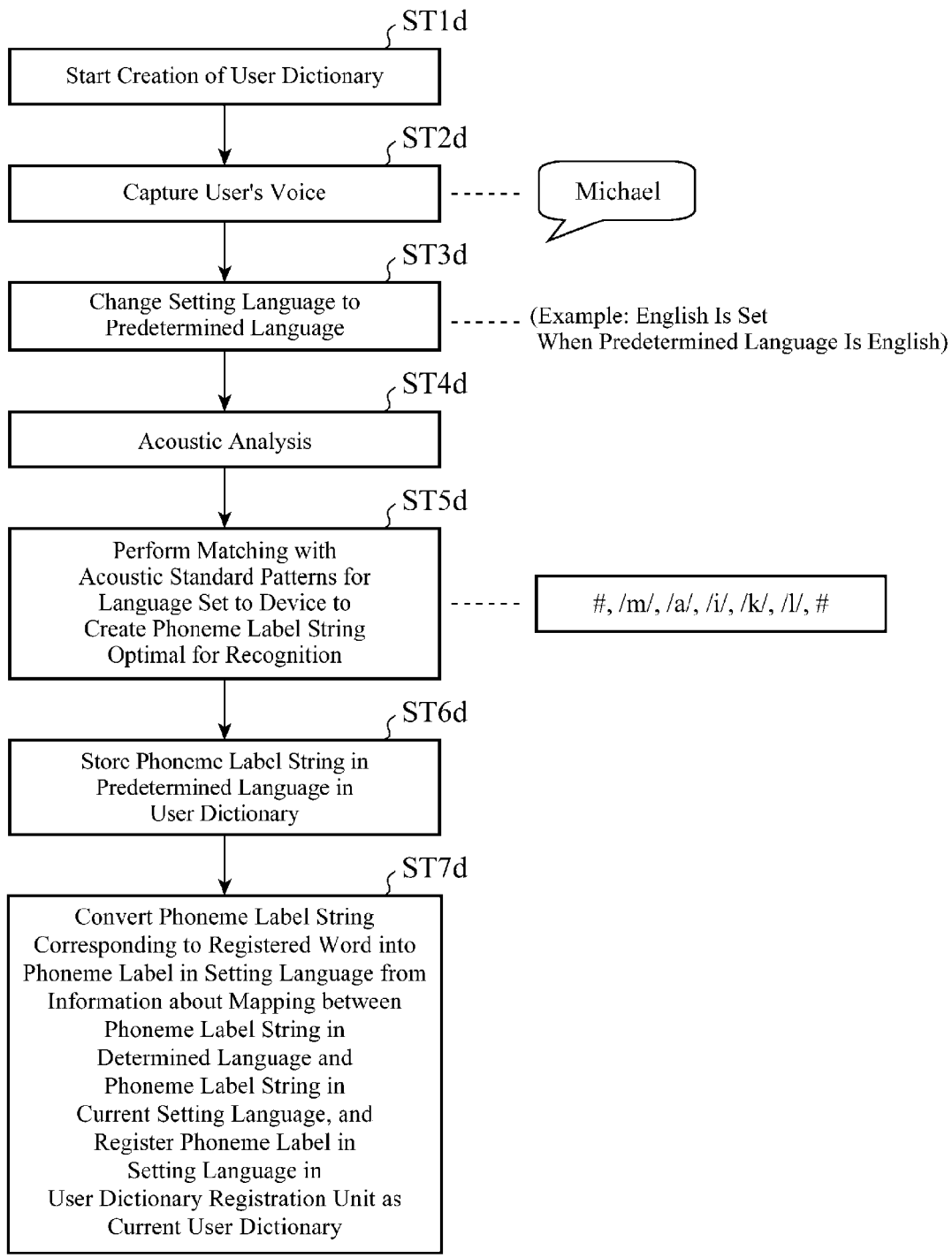
FIG. 9 is a flow chart showing a flow of a user dictionary registering operation performed by the recognition dictionary creating device in accordance with Embodiment 4.

FIG. 9 is a flowchart showing a flow of a user dictionary registering operation of the recognition dictionary creating device in accordance with Embodiment 4.

After commanding the recognition dictionary creating device to start creation of a user dictionary by using an input unit (step ST1d), a user utters a word which he or she is going to register in the recognition dictionary creating device. For example, it is assumed that the user utters "Michael" which is a personal name. A voice capturing unit 2 captures the voice uttered by the user via a microphone 2a, and then converts this inputted voice into a digital signal and outputs this digital signal to an acoustic analysis unit 3 (step ST2d).

Next, the sound-pattern-at-time-of-registration setting unit 19 sets the predetermined language which is registered therein in advance to the acoustic data matching unit 5 instead of the setting language set to the system (step ST3d). In the example of FIG. 9, English is set as the predetermined language. The acoustic analysis unit 3 performs an acoustic analysis on the voice signal inputted from the voice capturing unit 2 in step ST2d, and then converts this voice signal into a time series of acoustic features (step ST4d).

The acoustic data matching unit 5 reads acoustic standard patterns 4 corresponding to the predetermined language set thereto from the sound-pattern-at-time-of-registration setting unit 19, and creates an optimal phoneme label string showing the inputted voice from the acoustic standard patterns 4 corresponding to this language set thereto, and the time series of acoustic features of the inputted voice acquired by the acoustic analysis unit 3 (step ST5d). In a case in which the inputted voice is "Michael" and the predetermined language is English, the acoustic data matching unit acquires a phoneme label string of "#, /m/, /a/, /i/, /k/, /l/, #", as shown in FIG. 9.

A user dictionary registration unit 6 registers the phoneme label string of the inputted voice created by the acoustic data matching unit 5 in a user dictionary (step ST6d).

Next, a phoneme label string converting unit 9 brings the phoneme label string corresponding to the inputted voice (registered word) and expressed in the predetermined language which is acquired in the above-mentioned way into correspondence with a phoneme label expressed in the setting language currently set to the system according to an interlanguage acoustic data mapping table which is read from an interlanguage acoustic data mapping table storage unit 10 to convert the phoneme label string corresponding to the registered word registered in the user dictionary and expressed in the predetermined language into the phoneme label expressed in the setting language, and registers this phoneme label expressed in the setting language in the user dictionary registration unit 6 as the current user dictionary (step ST7d).

Next, an operation at the time of switching between setting languages is explained below.

Figure 10:
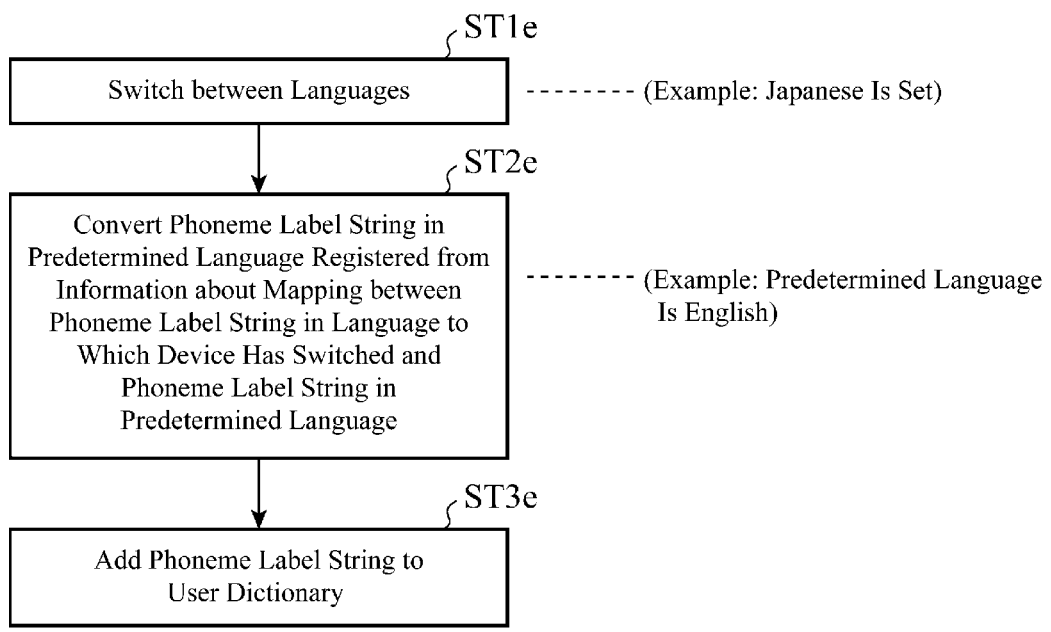
FIG. 10 is a flow chart showing a flow of the user dictionary registering operation which the recognition dictionary creating device in accordance with Embodiment 4 performs after switching between languages.

FIG. 10 is a flow chart showing a flow of the user dictionary registration operation which the recognition dictionary creating device in accordance with Embodiment 4 performs after switching between setting languages. A case in which after the user dictionary registration operation shown in FIG. 9 is performed, switching between setting languages is performed is shown.

In response to a language which the user newly sets to a language switching unit 8 by using an input unit, the language switching unit 8 sets the language to which the language switching unit has switched to the phoneme label string converting unit 9 (step ST1a). Hereafter, it is assumed that the language switching unit has switched to Japanese.

The phoneme label string converting unit 9 uses both the language to which the language switching unit has switched and which is specified by the language switching unit 8 and the predetermined language to search through the interlanguage acoustic data mapping table storage unit 10 to read the interlanguage sound data mapping table corresponding to the setting language at the time of registration in the user dictionary and the language to which the language switching unit has switched, and converts the phoneme label string expressed in the predetermined language which is registered in the user dictionary into a phoneme label string expressed in the language to which the language switching unit has switched according to the interlanguage acoustic data mapping table (step ST2e).

For example, the phoneme label string "#, /m/, /a/, /i/, /k/, /l/, #" of "Michael" in English which is the predetermined language is converted into "#, /m/, /a/, /i/, /k/, /r/, #" which is a Japanese phoneme label string according to the correspondence in the interlanguage acoustic data mapping table between English and Japanese which is the language to which the language switching unit has switched.

The user dictionary registration unit 6 additionally stores the phoneme label string to which the phoneme label string expressed in the predetermined language is converted by the phoneme label string converting unit 9 in step ST2e in the user dictionary (step ST3e). Referring to FIG. 10, because the registered word text is "Michael" and the language to which the language switching unit has switched is Japanese, "#, /m/, /a/, /i/, /k/, /r/, #" which is a Japanese phoneme label string is stored as a registered word.

As mentioned above, the recognition dictionary creating device in accordance with this Embodiment 4 is provided with the user dictionary in which a phoneme label string of an inputted voice is registered, the interlanguage acoustic data mapping table in which a correspondence between phoneme labels in different languages is defined, and the sound-pattern-at-time-of-registration setting unit 19 for selecting acoustic standard patterns corresponding to a preset language from acoustic standard patterns, and refers to the interlanguage acoustic data mapping table to convert the phoneme label string registered in the user dictionary and expressed in the language selected by the sound-pattern-at-time-of-registration setting unit 19 into a phoneme label string expressed in a language to which the recognition dictionary creating device has switched.

Because the recognition dictionary creating device is configured in this way, in a case in which one of N different languages can be set as an object language in which a word to be registered in the user dictionary is expressed, as compared with above-mentioned Embodiment 1 in which it is necessary to provide interlanguage acoustic data mapping tables corresponding to all of (N×(N−1))/2 combinations of the language set at the time of registration in the user dictionary and another language which can be set to the recognition dictionary creating device, the recognition dictionary creating device has only to provide interlanguage acoustic data mapping tables corresponding (N−1) combinations of the single predetermined language set by the sound-pattern-at-time-of-registration setting unit 19 and another language which can be set to the recognition dictionary creating device as mentioned above. Therefore, the recognition dictionary creating device according to this embodiment can reduce the data size of the interlanguage acoustic data mapping tables.

Although the cases in which the voice recognition device and the voice synthesizer are configured by using the recognition dictionary creating device 1 in accordance with above-mentioned Embodiment 1 are shown in above-mentioned Embodiments 2 and 3, respectively, the voice recognition device and the voice synthesizer respectively having the configurations shown in FIGS. 4 and 6 can be configured in combination with the recognition dictionary creating device 1a in accordance with above-mentioned Embodiment 4 shown in FIG. 8, instead of the recognition dictionary creating device in accordance with above-mentioned Embodiment 1. As a result, there can be provided a voice recognition device and a voice synthesizer which can also provide the same advantage as that provided by above-mentioned Embodiment 4.

Industrial Applicability

Because the recognition dictionary creating device in accordance with the present invention does not have to have a large-volume memory for storing voice utterances and create phoneme label strings for all languages in advance, and can shorten the time required to create phoneme label strings for each language, the recognition dictionary creating device in accordance with the present invention is suitable for use in a vehicle-mounted voice recognition device and a vehicle-mounted voice synthesizer.

The invention claimed is:

1. A recognition dictionary creating device comprising:
   an acoustic standard pattern storage to store acoustic standard patterns showing standard acoustic features for each language;
   a user dictionary storage to store a user dictionary;
   a language storage to store language information;
   a mapping table storage to store a mapping table in which a correspondence between phoneme labels in different languages is defined;
   a processor to execute a program;
   a memory to store the program which, when executed by the processor, results in performance of steps comprising:
   performing an acoustic analysis on a voice signal of an inputted voice to output a time series of acoustic features;
   comparing the time series of acoustic features with the acoustic standard patterns stored in said acoustic standard pattern storage to create a phoneme label string of said inputted voice;
   registering said phoneme label string in the user dictionary;
   storing a first language of the phoneme label string which is registered in said user dictionary into the language storage;
   switching from the first language to a second language; and
   referring to the mapping table stored in said mapping table storage to convert the phoneme label string registered in said user dictionary and expressed in the language shown by the information stored in said language storage into a phoneme label string expressed in the second language when the first language has been switched to the second language.

2. A voice recognition device comprising:
   an acoustic standard pattern storage to store acoustic standard patterns showing standard acoustic features for each language;
   a user dictionary storage to store a user dictionary;
   a general dictionary storage to store a general dictionary having a vocabulary expressed by said acoustic standard patterns;
   a language storage to store language information;
   a mapping table storage to store a mapping table in which a correspondence between phoneme labels in different languages is defined;
   a processor to execute a program;
   a memory to store the program which, when executed by the processor, results in performance of steps comprising:
   performing an acoustic analysis on a voice signal of an inputted voice to output a time series of acoustic features;
   comparing the time series of acoustic features with the acoustic standard patterns stored in said acoustic standard pattern storage to create a phoneme label string of said inputted voice;
   registering said phoneme label string in the user dictionary;
   storing a first language of the phoneme label string which is registered in said user dictionary into the language storage;
   switching from the first language to a second language;
   referring to the mapping table stored in said mapping table storage to convert the phoneme label string registered in said user dictionary and expressed in the language shown by the information stored in said language storage into a phoneme label string expressed in the second language when the first language has been switched to the second language;
   comparing the phoneme label string of said inputted voice with said general dictionary and said user dictionary to specify a word which is most similar to the phoneme label string of said inputted voice from said general dictionary and said user dictionary; and
   outputting the specified word as a voice recognition result.

3. A voice synthesizer comprising:
   an acoustic standard pattern storage to store acoustic standard patterns showing standard acoustic features for each language;
   a user dictionary storage to store a user dictionary;
   a general dictionary storage to store a general dictionary having a vocabulary expressed by said acoustic standard patterns;
   a language storage to store language information;
   a mapping table storage to store a mapping table in which a correspondence between phoneme labels in different languages is defined;
   a processor to execute a program;

a memory to store the program which, when executed by the processor, results in performance of steps comprising:
performing an acoustic analysis on a voice signal of an inputted voice to output a time series of acoustic features;
comparing the time series of acoustic features with the acoustic standard patterns stored in said acoustic standard pattern storage to create a phoneme label string of said inputted voice;
registering said phoneme label string in the user dictionary;
storing a first language of the phoneme label string which is registered in said user dictionary into the language storage;
switching from the first language to a second language;
referring to the mapping table stored in said mapping table storage to convert the phoneme label string registered in said user dictionary and expressed in the language shown by the information stored in said language storage into a phoneme label string expressed in the second language when the first language has been switched to the second language;
inputting a text;
detecting a word part corresponding to the phoneme label string registered in said user dictionary from a character string of the inputted text;
replacing said word part with the phoneme label string acquired from said user dictionary and corresponding to said word part;
replacing a part of the character string of said text other than said word part with a phoneme label string of a corresponding word in said general dictionary; and
creating a synthetic voice of said text from the phoneme label strings of said text.

4. A recognition dictionary creating device comprising:
an acoustic standard pattern storage to store acoustic standard patterns showing standard acoustic features for each language;
a user dictionary storage to store a user dictionary;
a mapping table storage to store a mapping table in which a correspondence between phoneme labels in different languages is defined;
a processor to execute a program;
a memory to store the program which, when executed by the processor, results in performance of steps comprising:
performing an acoustic analysis on a voice signal of an inputted voice to output a time series of acoustic features;
selecting acoustic standard patterns for a preset language from among the acoustic standard patterns stored in said acoustic standard pattern storage;
comparing the time series of acoustic features with the acoustic standard patterns for the language which are selected by said step of selecting acoustic standard patterns to create a phoneme label string of said inputted voice;
registering said phoneme label string in the user dictionary;
switching from a first language to a second language; and
referring to the mapping table stored in said mapping table storage to convert the phoneme label string registered in said user dictionary and expressed in the language selected by said step of selecting acoustic standard patterns into a phoneme label string expressed in the second language when the first language has been switched to the second language.

5. A voice recognition device comprising:
an acoustic standard pattern storage to store acoustic standard patterns showing standard acoustic features for each language;
a user dictionary storage to store a user dictionary;
a general dictionary storage to store a general dictionary having a vocabulary expressed by said acoustic standard patterns;
a mapping table storage to store a mapping table in which a correspondence between phoneme labels in different languages is defined;
a processor to execute a program;
a memory to store the program which, when executed by the processor, results in performance of steps comprising:
performing an acoustic analysis on a voice signal of an inputted voice to output a time series of acoustic features;
selecting acoustic standard patterns for a preset language from among the acoustic standard patterns stored in said acoustic standard pattern storage;
comparing the time series of acoustic features with the acoustic standard patterns for the language which are selected by said step of selecting acoustic standard patterns to create a phoneme label string of said inputted voice;
registering said phoneme label string in the user dictionary;
switching from a first language to a second language;
referring to the mapping table stored in said mapping table storage to convert the phoneme label string registered in said user dictionary and expressed in the language selected by said step of selecting acoustic standard patterns into a phoneme label string expressed in the second language when the first language has been switched to the second language;
comparing the phoneme label string of said inputted voice with said general dictionary and said user dictionary to specify a word which is most similar to the phoneme label string of said inputted voice from said general dictionary and said user dictionary; and
outputting the specified word as a voice recognition result.

6. A voice synthesizer comprising:
an acoustic standard pattern storage to store acoustic standard patterns showing standard acoustic features for each language;
a user dictionary storage to store a user dictionary;
a general dictionary storage to store a general dictionary having a vocabulary expressed by said acoustic standard patterns;
a mapping table storage to store a mapping table in which a correspondence between phoneme labels in different languages is defined;
a processor to execute a program;
a memory to store the program which, when executed by the processor, results in performance of steps comprising:
performing an acoustic analysis on a voice signal of an inputted voice to output a time series of acoustic features;
selecting acoustic standard patterns for a preset language from among the acoustic standard patterns stored in said acoustic standard pattern storage;
comparing the time series of acoustic features with the acoustic standard patterns for the language which are selected by said step of selecting acoustic standard patterns to create a phoneme label string of said inputted voice;

registering said phoneme label string in the user dictionary;
switching from a first language to a second language;
referring to the mapping table stored in said mapping table storage to convert the phoneme label string registered in said user dictionary and expressed in the language selected by said step of selecting acoustic standard patterns into a phoneme label string expressed in the second language when the first language has been switched to the second language;
inputting a text;
detecting a word part corresponding to the phoneme label string registered in said user dictionary from a character string of the inputted text;
replacing said word part with the phoneme label string acquired from said user dictionary and corresponding to said word part;
replacing a part of the character string of said text other than said word part with a phoneme label string of a corresponding word in said general dictionary; and
creating a synthetic voice of said text from the phoneme label strings of said text.

\* \* \* \* \*